US006217061B1

(12) United States Patent
Harland et al.

(10) Patent No.: US 6,217,061 B1
(45) Date of Patent: Apr. 17, 2001

(54) AIRBAG SYSTEM WITHIN IMPACT COUNTERMEASURES

(75) Inventors: Charles E Harland, Marysville; Paul G Maertens, Highland; Matthew H Kasprowicz, Troy, all of MI (US); Dennis R Rogers, Sanford, NC (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/507,200

(22) Filed: Feb. 18, 2000

(51) Int. Cl.[7] .................................................. B60R 21/22
(52) U.S. Cl. ........................................ 280/730.2; 280/751
(58) Field of Search .......................... 280/728.2, 728.1, 280/730.1, 730.2, 751, 752; 296/35.2

(56) References Cited

U.S. PATENT DOCUMENTS

| | | |
|---|---|---|
| 4,948,168 | 8/1990 | Adomeit et al. . |
| 4,989,896 | 2/1991 | DiSalvo et al. . |
| 5,265,903 | 11/1993 | Kuretake et al. . |
| 5,362,097 | 11/1994 | Barske . |
| 5,382,051 | 1/1995 | Glance . |
| 5,431,435 | 7/1995 | Wilson . |
| 5,437,469 | 8/1995 | Monden . |
| 5,490,691 | 2/1996 | Sinnhuber et al. . |
| 5,540,459 | 7/1996 | Daniel . |
| 5,564,735 | 10/1996 | Boy et al. . |
| 5,569,959 | 10/1996 | Cooper et al. . |
| 5,605,346 | 2/1997 | Cheung et al. . |
| 5,615,908 | 4/1997 | Phillion et al. . |
| 5,651,582 | 7/1997 | Nakano . |
| 5,669,627 | 9/1997 | Marjanski et al. . |
| 5,681,051 | 10/1997 | Phillion . |
| 5,700,028 | 12/1997 | Logan et al. . |
| 5,752,714 | 5/1998 | Pripps et al. . |
| 5,775,726 | 7/1998 | Timothy et al. . |
| 5,791,683 | * 8/1998 | Shibata et al. ..................... 280/730.2 |
| 5,868,421 | 2/1999 | Eyrainer . |
| 5,899,489 | 5/1999 | Jost . |
| 5,921,576 | 7/1999 | Sinnhuber . |
| 6,079,732 | * 6/2000 | Nakajima et al. ................. 280/728.2 |

* cited by examiner

*Primary Examiner*—Paul N. Dickson
(74) *Attorney, Agent, or Firm*—Marc Lorelli

(57) ABSTRACT

An air bag system that includes impact countermeasures is provided. The apparatus includes an air bag that is attached to a vehicle body via a base plate. The base plate includes a plurality of ribs extending therefrom disposed in a manner such that the plurality of ribs can be transitioned to allow a path for deployment the airbag. Deployment of the air bag protects occupants during certain types of collision and the impact countermeasures, the plurality of ribs, absorbs energy during certain types of impacts with the apparatus.

11 Claims, 4 Drawing Sheets

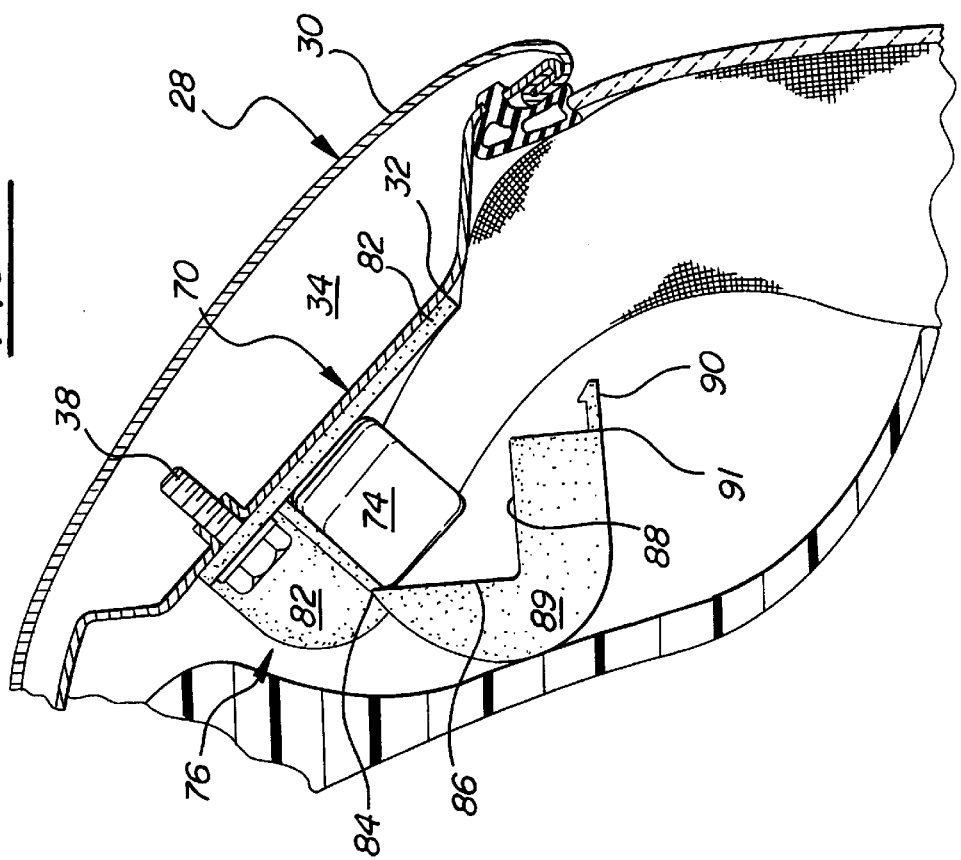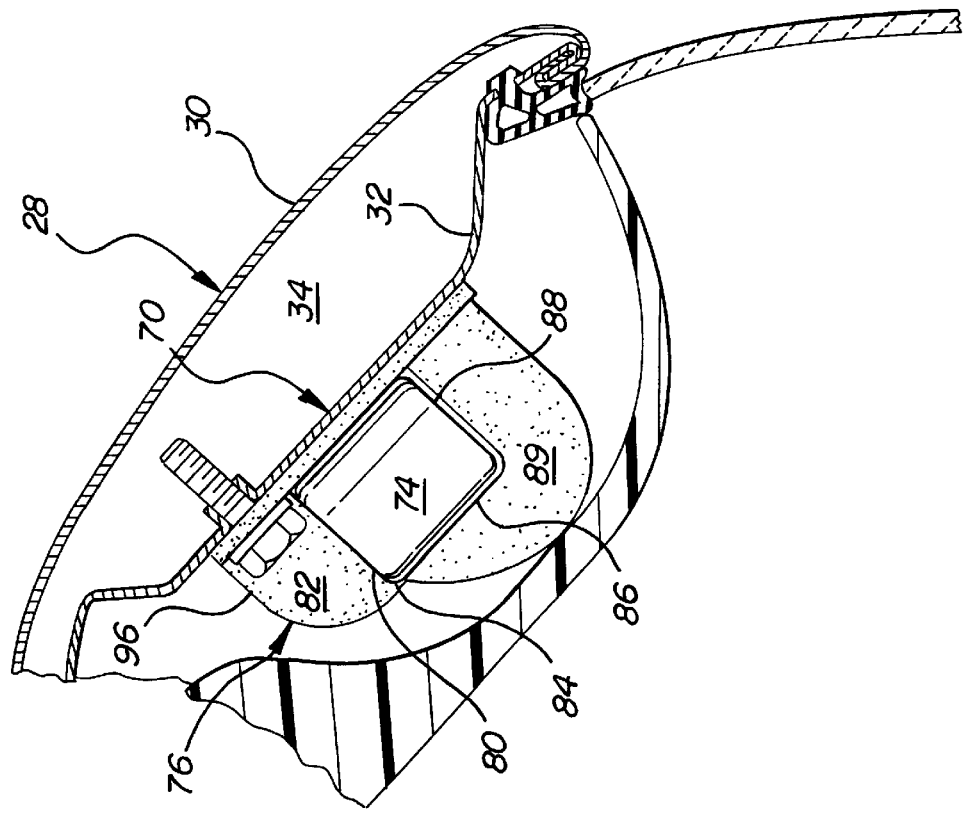

AIRBAG SYSTEM WITHIN IMPACT COUNTERMEASURES

BACKGROUND OF THE INVENTION

1. Technical Field

The present invention relates in general to motor vehicle safety systems. More particularly, the present invention relates to an airbag apparatus for motor vehicles. More specifically, but without restriction to the particular embodiment and/or use which is shown and described for purposes of illustration, the present invention relates to an airbag apparatus that includes impact counter measures.

2. Discussion

Automobiles have incorporated many safety systems into their design over the years to help protect the occupants during various types of collisions. The seatbelt, which keeps occupants securely fastened to their seat, was and arguably still is the most prevalent safety device in the industry.

In recent years, both the government and the automotive industry realized the advantages that an inflatable occupant restraint system or airbag system could provide. The drive to develop and implement such a system was so strong that within just a few years almost all vehicles included inflatable occupant restraints that protected occupants during frontal collisions. Soon after the introduction of these frontal airbags, the industry began looking for ways and methods of protection during side collisions.

One intuitive response was to incorporate inflatable restraints to enhance the protection of the occupants during a collision from the lateral side of a vehicle. These inflatable restraints for lateral or side collisions have been placed in a number of locations within the vehicle. For example, some vehicles have airbags placed in the side of the vehicle seat whereby during a collision the airbag deploys from the side of the seat and forms against the lateral side of the vehicle interior. Other vehicles have placed airbags in the doors that protect during side collisions. Sometimes, due to packaging constraints, it is preferable to place an airbag in either a pillar or over the door header as disclosed in U.S. Pat. No. 5,791,683 assigned to Toyota Gisei Company Limited. Unfortunately, this leads to a number of problems. Most specifically, vehicle regulations in the United States now require that portions of the vehicle interior above the belt line of the occupants have specific energy absorbing characteristics. This requirement FMVSS 201 has lead automotive companies to place impact countermeasures behind headliners and trim pieces in order to satisfy this energy absorbing requirements. Countermeasures include, but are not limited to, energy absorbing foam and crushable plastic ribs that act to absorb impact energy.

It is obviously desirable to have a clear, appointed path for any airbag. This is typically employed by the use of the deployment door that is hinged on one end and is moved out of the way by the force of the airbag. This is the standard practice for frontal airbags disposed within the steering wheel, the instrument panel of the vehicle, and a vehicle door. This standard practice becomes more difficult when airbags are disposed in a pillar or over the door header. The '683 patent includes such an airbag and disclosures a garnished trim that opens to allow deployment of the airbag. U.S. Pat. No. 5,540,459 assigned to Ford Motor Company describes another arrangement for a side airbag disposed above the door header. In the '459 patent, the airbag deployment forces the headlines inboard so that the airbag can deploy along the lateral side of the vehicle. Although the arrangements that are disclosed in patent number '459 and '683 perform satisfactorily, neither includes impact counter measures in their design. With the addition of these impact counter measures, like ribs or foam, this becomes much more difficult to provide a clear path for airbag deployment. It is therefore desirable to have an airbag system with impact counter measures that allows for deployment of an airbag in a controlled and predetermined direction.

SUMMARY OF THE INVENTION

Accordingly, it is the principal objective of the present invention to provide an bag system that includes impact countermeasures, the air bag being employed to protect occupants during certain types of collisions and the impact countermeasures design to absorb energy during impacts therewith.

It is another objective of the present invention to provide energy absorbing ribs disposed near an air bag module that can be displaced by the deployment of the air bag.

It is a further objective of the present invention to provide a means to create a clear path of deployment for an air bag that protects during collisions on the lateral side of the vehicle.

In one form, the present invention includes an air bag that is attached to a vehicle body via a base plate. The base plate includes a plurality of ribs extending therefrom, such that the plurality of ribs can be transitioned to allow a path for deployment the airbag.

In another form, the present invention includes an air bag attached to a vehicle body via a base plate that includes a support section, a cover section, and a rib portion with a tear seam disposed between the support section and the rib portion whereby deployment of the air bag will dissociate the rib portion from the support section of the base plate.

In yet another form, the present invention includes an air bag attached to a vehicle body via a base plate that includes a housing that forms a rectangular structure that encompasses the air bag. The housing is constructed with a living hinge between two of the sides thereof to provide pivoting of at least a portion of the structure during deployment of the air bag.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The drawings, which form an integral part of the specification, are to be written in conjunction therewith, and like reference numerals are employed to designate identical components in various views.

FIG. 5 is a cross-sectional view of a second embodiment of the present invention along the line 2—2 of FIG. 1.

FIG. 6 is a cross-sectional view along the line 2—2 of FIG. 1 of the second embodiment of the present invention showing the deployment of the airbag situated therein.

DETAILED DESCRIPTION OF THE PREFERRED EMBODIMENT

An apparatus comprising an air bag system with impact countermeasures is provided. In the following description, numerous specific details are set forth in order to provide a more comprehensive description of the present invention. It will be apparent, however, to one skilled in the art, that the present invention may be practiced without these specific details. In other instances, specific details of well-known features have not been described so as not to obscure the present invention.

Figure 1:
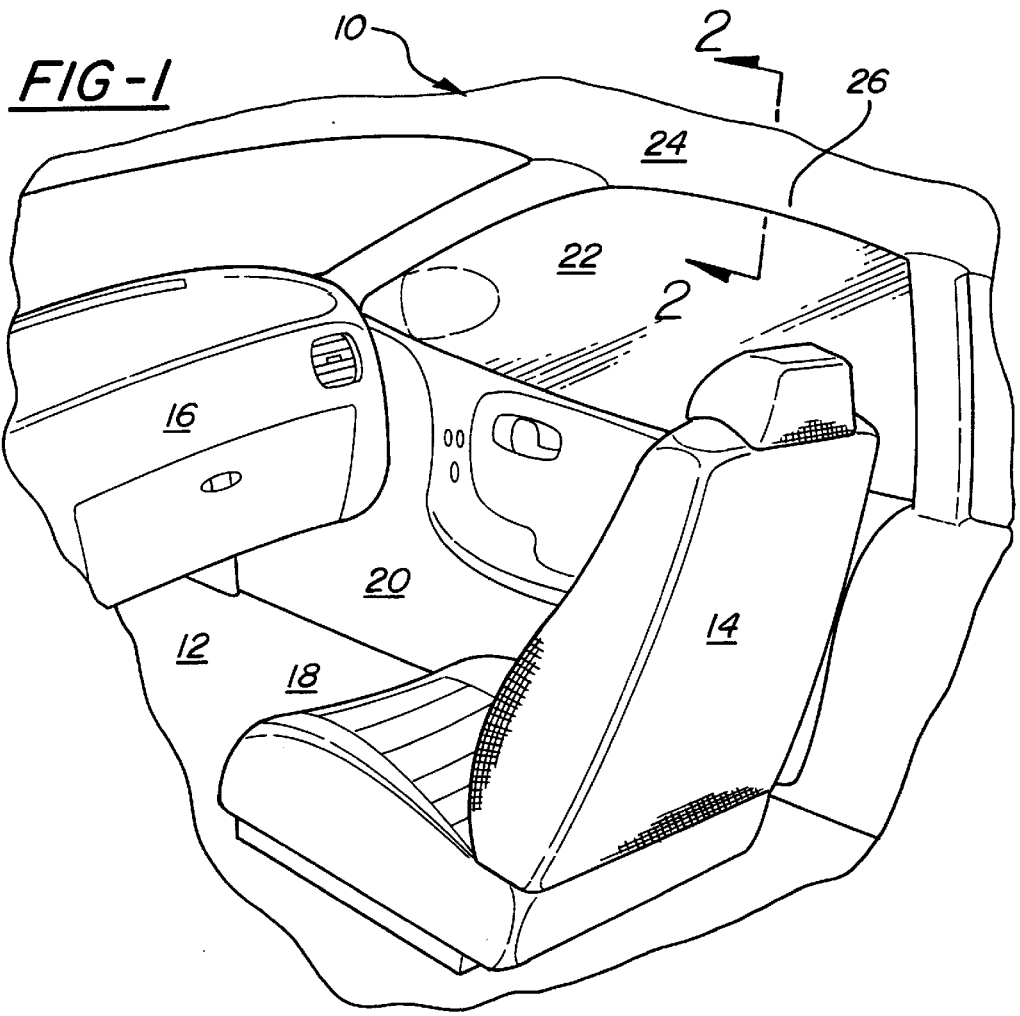
FIG. 1 is a perspective view of a vehicle interior showing the passenger side, front seat and associated windows and headliner.

Referring now to the drawings, FIG. 1 provides a perspective view of a vehicle 10 including the airbag system with impact countermeasures of the present invention. Vehicle 10 includes an interior 12, which includes among other things, a front passenger seat 14 and instrument panel 16 disposed forward thereof. Vehicle interior 10 also includes a vehicle floor 18 that defines the lowermost boundaries of the vehicle interior 12. The lateral boundaries of the vehicle interior 12 are formed by a front vehicle door 20 and a front vehicle window 22 that extends upward from vehicle door 20 and can be reversibly translated in a vertical manner. Vehicle interior 12 is bounded on the upwardmost surface by headliner 24 which extends substantially from vehicle window 22 on the right side of the vehicle to the vehicle window (not shown) on left side of the vehicle. It should be appreciated that the left and right side of the vehicle are substantially identical for purposes of this disclosure, therefore only the right side will be described and illustrated in detail. Headliner 24 includes a header portion 26, which extends in a longitudinal manner and is disposed vertically above front window 22.

Figure 2:
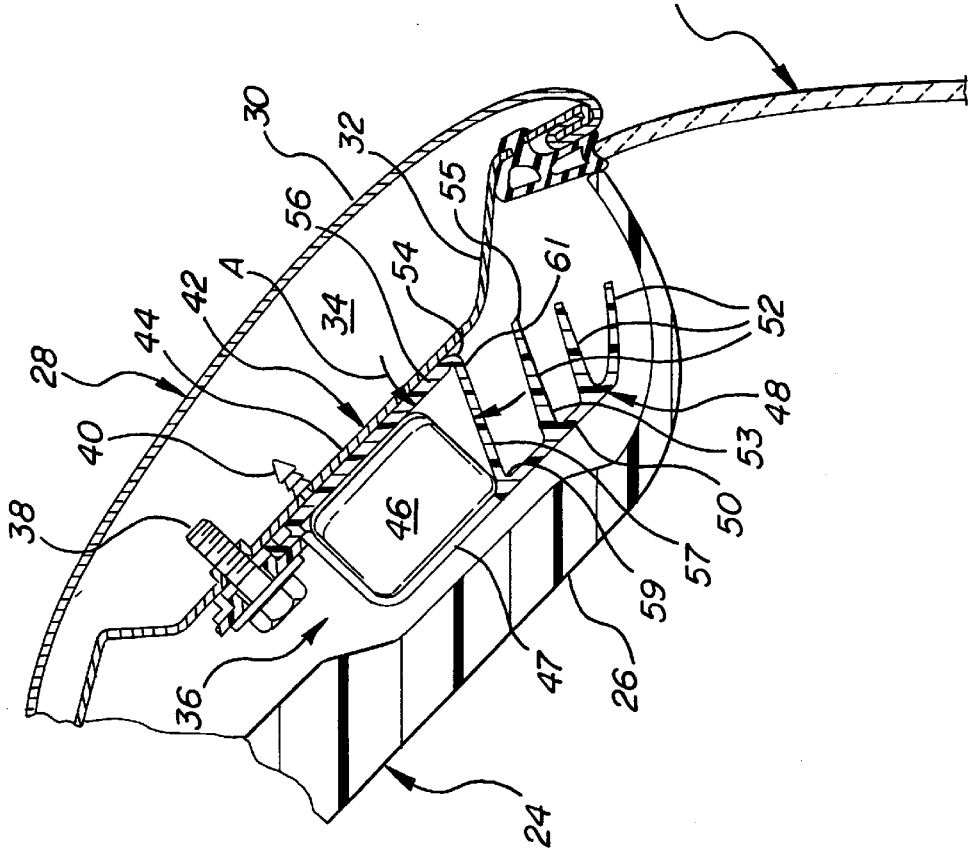
FIG. 2 is a cross-sectional view of the first embodiment of the present invention along the line 2—2 of FIG. 1.

Turning to FIG. 2, the header portion 26 of the headliner 24 is described in detail along cross-sectional line 2—2 of FIG. 1. Vehicle body 28 that includes outer sheet metal 30 and inner sheet metal 32 provides structural support to this region of the vehicle. Outer sheet metal 30 also provides an aesthetic appearance to the exterior of the vehicle. It should be appreciated, although not specifically shown in the drawings of the preferred embodiment of the present invention, that inner sheet metal 32 and outer sheet metal 30 are welded together to form a cross-sectional area 34 that provides the structural support to this area of the vehicle. Inner sheet metal 32 includes various apertures and/or attachment points for numerous articles that can be attached thereto.

In FIG. 2, a first exemplary embodiment of the present invention is illustration. Airbag module 36 is attached to the inner sheet metal 32 via bolt 38 and locating pin 40. Airbag module 36 includes a base plate 42 that extends longitudinally with the header portion 26 of the headliner 24. Base plate 42 includes attachment features, such as apertures, that allow bolt 38 and locating pin 40 to attach thereto. In the first exemplary embodiment, locating pin 40 is integrally formed with the base plate 42. Base plate 42 includes localized sections that are positioned to encircle the lateral cross section of the air bag 46. A support section 56 is disposed between air bag 46 and inner sheet metal 32 and a cover section 47 is disposed about the inboard side of air bag 36. The support section 56 and the cover section 47 will be described in more detail in FIGS. 4A and 4B.

Base plate 42 extends latterly in an outboard direction from airbag 46 to form a rib portion 48. The rib portion 48 includes a supporting member 50 that extends longitudinally along the window 22 of the vehicle 10 and is disposed adjacent to the headliner 24 of the vehicle. The supporting member 50 of the rib portion 48 is also attached to the localized cover sections 47 of the base plate 42. The supporting member 50 has a plurality of ribs 52 extending therefrom in the outboard direction or toward the vehicle body 28. The exemplary embodiment includes three ribs cantilevered from the base portion 50. Each of the ribs 52 includes a support end 53 and a free end 55. The rib portion 48 also includes a connecting rib 57 joining rib portion 48 and the support section 56 of the base plate 42. The connecting rib 57 has a support end 59 attached to supporting member 50 and a tear end 61 connected via a tear seam 54 to the support section 56 of the base plate 42. Tear seam 54 consists of a portion of the base plate 42 that preferably includes a section of diminished material thickness that extends substantially through the longitudinal length of the base plate 42. This not only provides for tearing advantages but also allows this seam to act as a living hinge as will be discussed in reference to FIG. 4A. Alternatively, tear seam 54 could be comprised of a plurality of apertures formed substantially along the longitudinal length of the base plate 42 to form a type of perforated arrangement. Although two alternatives for the construction of tear seam 54 have been disclosed, one skilled in the art may appreciate many other techniques for providing a tear seam for the present invention. Furthermore, plastic webbing may also be added between the ribs to obtain greater stiffness if desired.

The tear seam 54 defines an angle between support portion 56 of base plate 42 and the connecting rib 57. This angle referenced by "A" in the FIG. 2 is an acute angle. Angle "A" is formed by the connecting rib 52, longitudinal portion 56 of base plate 42, and the airbag 46. It should be appreciated that angle "A" is formed opposite from the side of the triangle that is formed by airbag 46. This triangular region allows for the airbag deployment to be directed into tear seam 54 which will act to separate the support portion 56 of the base plate 42 from the rib portion 48 of the base plate 42 when force is applied thereon from the deployment of the air bag 46. This separation provides for an unencumbered path for airbag deployment. It should be appreciated that although the support portion 56 and the rib portion 48 disassociate, the rib portion 48 is still connected to the base plate by the localized cover support strips 47.

Figure 3:
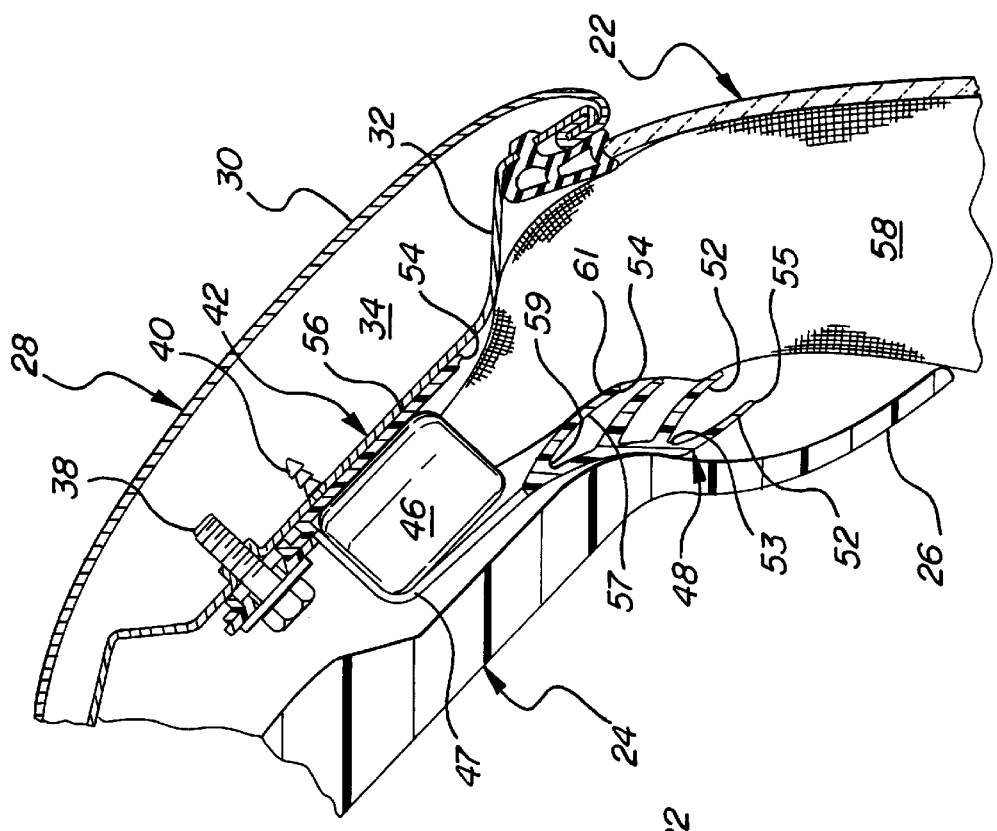
FIG. 3 is a cross-sectional view of the first embodiment of the present invention shown along the line 2—2 of FIG. 1 showing the deployment of the airbag situated therein.

Airbag 46 is adopted to deploy in an outboard and downward direction towards vehicle window 22. Air bag 46 deployment, as shown in FIG. 3, separates the support section 56 of the base plate 42 at the tear seam 54 leaving the support portion 56 of the base plate 42 attached to the inner sheet metal 32 and the rib portion 48 attached only to the cover support 47 of the base plate 42 which is attached to the inner sheet metal 32 at bolt 38. The rib portion 48 is moved generally inboard and downward therefrom by the deployment of the airbag 46. The airbag 46 deployment, referenced by numeral 58 in FIG. 3, is directed in such a manner that the rib portion 48 and the headliner 24, more specifically the header portion of the headline 26, are moved inboard so that the airbag 46 can deploy in a proper manner.

Ribs 48 are disposed in such a manner that impact therewith will cause ribs 52 to deform so as to absorb energy from any impact of this area. It is well known in the art to provide crushable plastic ribs to absorb energy during an impact with this region of the vehicle interior 12. It should also be appreciated that in addition to crushable ribs, that may absorb energy in certain types of situations, airbag 46 can be deployed in order to protect occupants of the vehicle during other types of impact or collision situations.

Figure 4A:
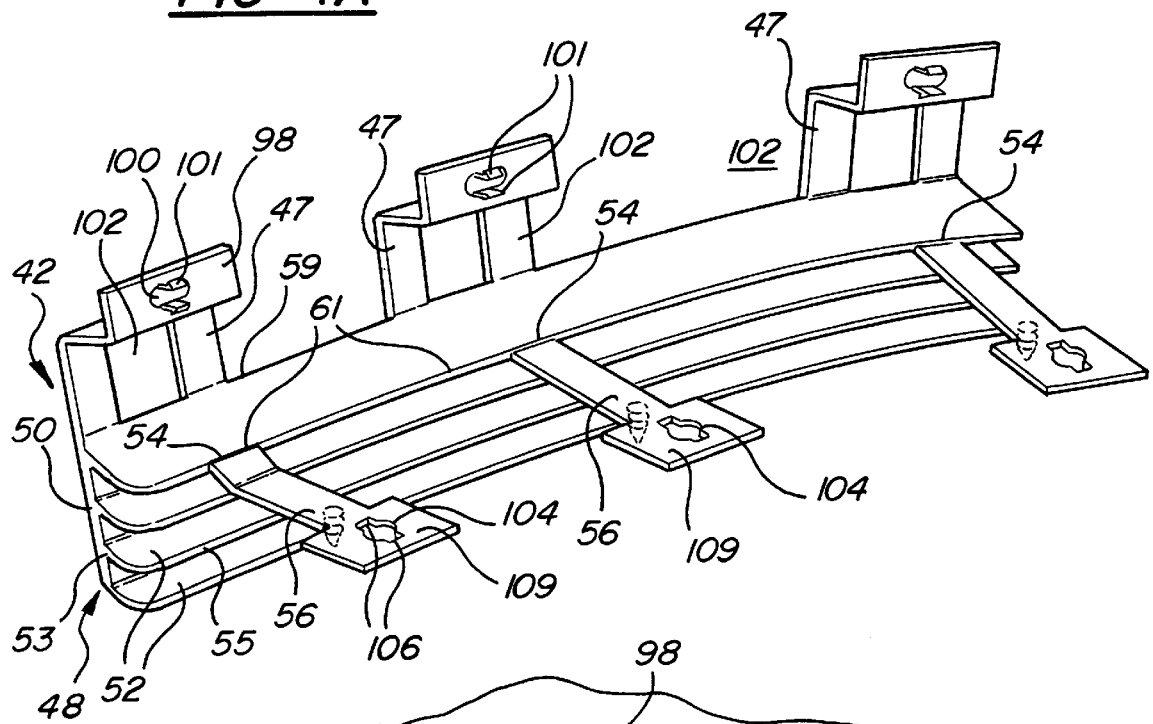
FIG. 4A is a perspective view of the base plate of the first embodiment of the present invention shown prior to installation into the vehicle.
Figure 4B:
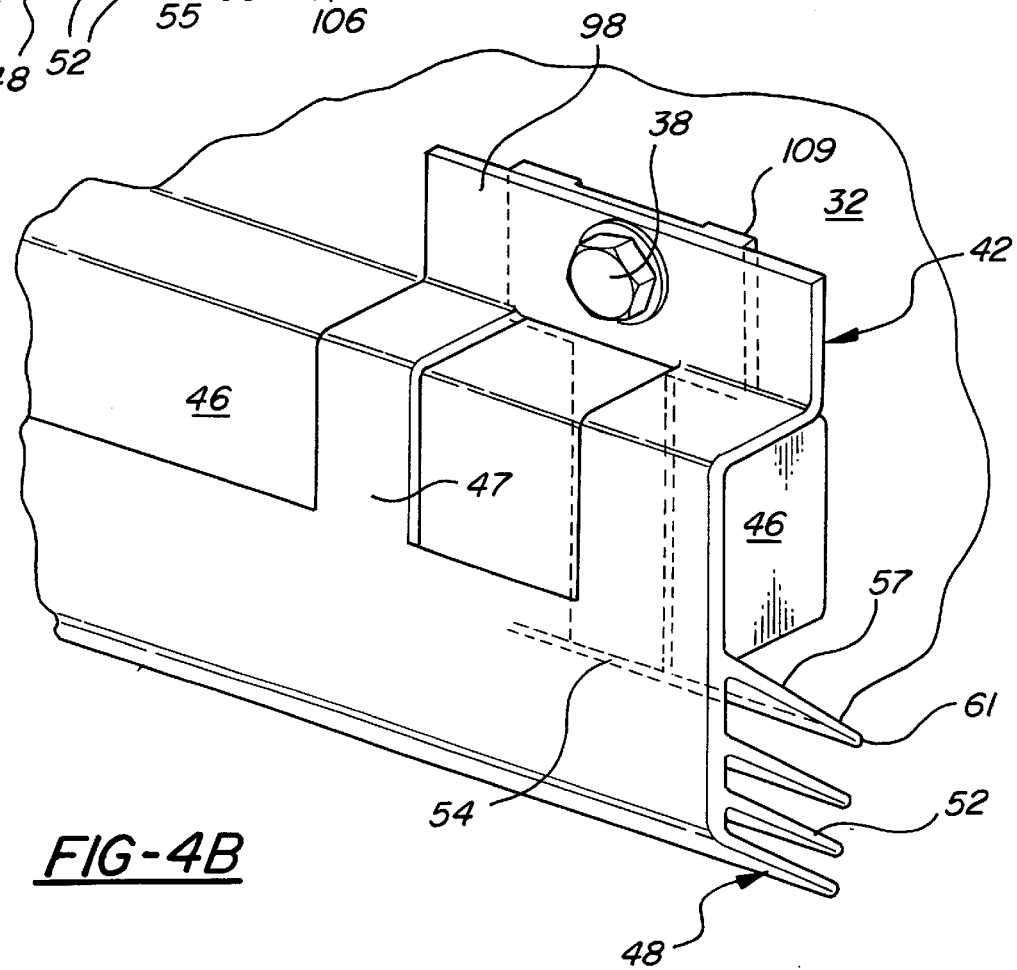
FIG. 4B is a perspective view of the first embodiment of the present invention from the vehicle interior with the headliner removed therefrom.

Turning to FIG. 4A, the base plate 42 is illustrated in its preassembled state. The cover portion 47 of the base plate is formed by localized strips that extend from the support end 59 of connecting rib 57 and terminate in a mounting flange 98 having a bore 100 formed therein that is flanked by two protruding clips 101. The support portion 56 of the base plate 42 is shown cantilevered from the connecting rib 57. The support portion 56 is pivotal about tear seam 54 such that when support portion 56 is pivoted upwards, a cavity 102 is formed between the cover portion strips 47 and the support portion strips 56. Cavity 102 is adapted to receive air bag 46 therein, as illustrated in FIG. 4B. The support portion 56 includes a mounting area 109 that includes an aperture 104 formed therein. Aperture 104 includes a generally circular opening with two additional recesses 106 formed on opposing ends thereof. Recesses 106 are adopted to cooperate with the two protruding clips 101 of the mounting flange 98 of the cover portion 47.

FIG. 4B, illustrates an exemplary depiction of the first embodiment of the present invention from a perspective view from the inside of a vehicle cabin 20 with the headline 14 removed for illustration purposes. Bolt 38 is shown coupling the cover portion 47 and the support portion 56 (dashed lines) of the base plate 42 to the inner sheet metal 32 of the motor vehicle 10.

Figure 7:
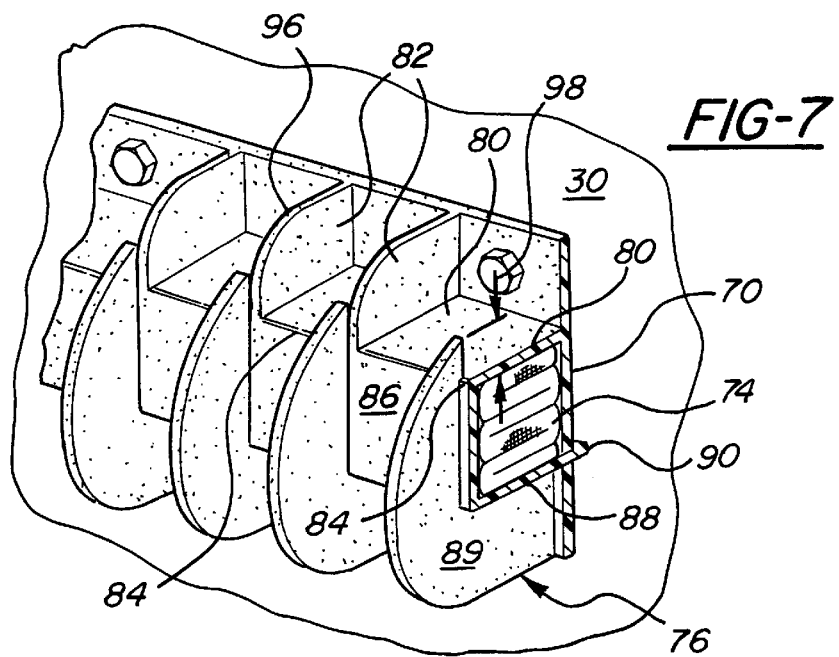
FIG. 7 is a perspective view of the second embodiment of the present invention from the vehicle interior with the headliner removed therefrom.

Now turning to the second embodiment of the present invention and to FIG. 5. FIG. 5 is cross-sectional view of the vehicle 10 along the line 2—2 as shown in FIG. 1. FIG. 5 includes the same structural components as does FIG. 2 of the first embodiment of the present invention. The vehicle body 28, outer sheet metal 30, and outer sheet metal 32 are all substantially identical, as is headliner 24 and header portion 26 of vehicle headliner. The front vehicle window 22 is also disposed in a substantially similar way to the first embodiment of the present invention. The second embodiment of the present invention also includes a base plate 70 that is used to attach the airbag module to the inner sheet metal 32 of the vehicle body. The airbag 74 that is attached to the base plate 70 is circumscribed by a preferably plastic housing 76. Housing 76 is, preferably, integrally formed with base plate 70. Housing 76 has a variety of structures that can only be described in complete detail with reference to both FIG. 5 and FIG. 7. FIG. 7 is a perspective view of the second embodiment of the present invention with the headliner 24 removed therefrom. Housing 76 includes an inboard extending top surface 80 that defines the upward most boundary to the airbag 74. The surface has a plurality of upper ribs 82 extending upward therefrom. The upper ribs 82 are again provided to absorb energy during certain types of impacts. The top surface 80 extends inboard to a hinge point 84. The hinge point 84 is formed between the top surface 80 and the side surface 86 of the housing 76. Side surface 84 extends downward and contacts bottom surface 88 at substantially a right angle. It should be appreciated that base plate 70, top surface 80, bottom surface 88, and side surface 86 form a substantially rectangular structure that encloses said air bag 74. Bottom surface 88 and side surface 86 include a plurality of lower ribs 89 extending therefrom. The side surface 86 and the bottom surface 88 along with the integrally formed lower ribs 89 are adapted to pivot about hinge point 84 in the event of airbag 74 deployment. The pivoting of these elements of the housing 76 allows airbag 74 to deploy in a path that is substantially clear from any obstructions as best shown in FIG. 6.

Bottom surface 88 of the housing 76 also includes locking tab 90 extending from the free end 91 thereof. Locking tab 90 attaches into an aperture 92 of the base plate 70. Locking tab 90 is simply cantilevered from bottom surface 88 so as to bend to cooperatively fit into aperture 92 of base plate 70. It should be appreciated that the force produced by the deployment of the air bag is enough to either severe or remove the locking tab 90 from aperture 92 in base plate 70.

The upper ribs 82 and lower ribs 89 that extend from adapted to crush during certain types of impact to absorb energy. Housing 76 includes a plurality of upper ribs 82 that extend from the base plate 70 and contact the top most surface 80 of the housing 76. Upper ribs 82 have a curved outer surface 96 and extend only to the hinge point 84 between the top surface 80 and the side surface 86. It should be appreciated that any extension beyond the hinge point 84 will deteriorate the activity and performance of the apparatus as shown in the second embodiment of the present invention. Lower ribs 89 are integrally formed with the bottom surface 88 and the side surface 86 of the housing 76 extend therefrom such that the lower ribs 89 are adjacent to base plate 70 at one end and extends vertically beyond hinge point 84 at the other end by a distance referenced by numeral 98. It should be appreciated that ribs 89 extend from the side surface 86 in a manner directly vertical from side surface 86. It should also be appreciated that distance 98 is less than the width of the top surface 80. The inboard most portion of the lower ribs 89 are curved in nature so as to absorb energy from any collision therewith. The precise shape of the ribs may also be determined by the packaging space available between the headliner and the sheet metal. As the airbag is deployed, the bottom surface 88 and side surface 86 are pivoted about hinge point 84 so as to allow a cleared appointment path for airbag 74. It should be appreciated that the pivotal motion of hinge 84 is limited by the distance 98 that the lower ribs 89 extend beyond the hinge point and define a maximum allowable pivoting that can be accomplished. Again, as with the first embodiment of the present invention, the ribs that extend from housing 76 are used to absorb energy during certain types of impacts with this area of the vehicle while the airbag would be deployed in order to protect occupants of the vehicle during other types of impact or collisions situations.

The foregoing description constitutes the preferred embodiments devised by the inventors for practicing the invention. It is apparent, however, that the invention is susceptible to modification, variation and change that will be obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. An air bag assembly comprising:
   an air bag;
   a base plate attached to a vehicle body and adapted to position said air bag relative to the vehicle body, said base plate includes a support section and a rib portion on one side thereof, said rib portion includes a plurality of ribs adapted to absorb energy during an impact with said air bag assembly, said rib portion being attached to said support section by a tear seam, said tear seam adapted to dissociate said rib portion from said support section during air bag deployment.

2. The apparatus as set forth in claim 1, further comprising a cover section and wherein said rib portion includes a base member and said plurality of ribs extending therefrom, said plurality of ribs include a top connector rib having a first and second opposing end, said first end being attached to said base member and said cover section and said second end contacting said tear seam.

3. The apparatus as set forth in claim 2, wherein said plurality of ribs extend from said base member towards said vehicle body.

4. The apparatus as set forth in claim 3, wherein said connecting rib of said rib portion, said support section of said base plate, and said air bag form a substantially triangular area therebetween.

5. The apparatus as set forth in claim 4, wherein said air bag is disposed on the opposite side of said substantially triangular area of said tear seam.

6. The apparatus as set forth in claim 4, wherein said support section of said base plate and said connecting rib form an acute angle therebetween.

7. The apparatus as set forth in claim 6, wherein said tear seam is comprised of a region of diminished material thickness that extends longitudinally along said base plate.

8. The apparatus as set forth in claim 2, wherein said support section includes a locating pin formed integrally therewith and an aperture formed therein.

9. The apparatus as set forth in claim 8, wherein said cover section includes a mounting flange having a bore formed therein and at least one clip adapted to cooperate with said aperture of said support section, said cover section, support section, and said connector rib cooperating to laterally circumscribe said air bag.

10. The apparatus as set forth in claim 9, wherein said bore of said cover section and said aperture of said support section are adapted to receive a bolt therethrough for attaching said base plate to the vehicle body.

11. An apparatus comprising:
a motor vehicle having a vehicle body and a window defining the exterior thereof;
an air bag disposed longitudinally above the window;
a base plate attached to the vehicle body and adapted to position said air bag relative to the vehicle body, said base plate includes a support section, a cover section, and a rib portion on one side thereof, said rib portion includes a plurality of ribs, at least one of said plurality of ribs having a free end, said rib portion being attached to said support section by a tear seam, said tear seam adapted to dissociate said rib portion from said support section during air bag deployment, said support section includes an aperture formed therein, said cover section includes a mounting flange with a bore formed therein and at least one clip projecting therefrom adapted to cooperate with said aperture of said support section to couple said support section and said cover section, said support section, cover section, and rib portion cooperate to laterally circumscribe said air bag.

* * * * *